(12) United States Patent
Balakrishnan et al.

(10) Patent No.: US 8,793,271 B2
(45) Date of Patent: Jul. 29, 2014

(54) SEARCHING DOCUMENTS USING A DYNAMICALLY DEFINED IGNORE STRING

(75) Inventors: Sreeram V. Balakrishnan, Los Altos, CA (US); Michael Busch, San Jose, CA (US); Christopher J. Hinrichs, San Jose, CA (US); Tom W. Jacopi, San Jose, CA (US); Andreas Neumann, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 12/413,163

(22) Filed: Mar. 27, 2009

(65) Prior Publication Data

US 2010/0250580 A1    Sep. 30, 2010

(51) Int. Cl.
*G06F 17/30* (2006.01)
(52) U.S. Cl.
USPC .......................................................... 707/769
(58) Field of Classification Search
USPC .............................. 707/0.603, 703, 706, 769
See application file for complete search history.

(56) References Cited

U.S. PATENT DOCUMENTS

| | | | |
|---|---|---|---|
| 6,070,160 A * | 5/2000 | Geary ................................... | 1/1 |
| 7,159,011 B1 * | 1/2007 | Knight et al. ................. | 709/207 |
| 7,433,876 B2 * | 10/2008 | Spivack et al. ....................... | 1/1 |
| 2002/0026435 A1 | 2/2002 | Wyss et al. | |
| 2006/0143171 A1 * | 6/2006 | Doerre et al. ...................... | 707/5 |
| 2007/0156677 A1 * | 7/2007 | Szabo ................................ | 707/5 |
| 2007/0219988 A1 * | 9/2007 | Mueller et al. .................... | 707/5 |
| 2008/0077570 A1 | 3/2008 | Tang et al. | |

OTHER PUBLICATIONS

"IBM eDISCOVERY Analyzer, Version 2.1" Sep. 2008, retrieved from http://publib.boulder.ibm.com/infocenter/email/v1r0m0/index.jsp?topic=/com.ibm.eda.doc/configuring/edaao002.htm. Abstract only.

* cited by examiner

*Primary Examiner* — Amresh Singh
(74) *Attorney, Agent, or Firm* — Patterson & Sheridan, LLP

(57) ABSTRACT

Techniques are disclosed for searching a plurality of documents using a dynamically defined ignore string. The ignore string may be specified by a user. An overlay index may be generated over the plurality of documents. The overlay index may include a posting list for each term in the ignore string. Each posting list may specify the documents of the plurality of documents in which the respective term occurs outside of the ignore string. The overlay index may also include a posting list that specifies all occurrences of the ignore string in the plurality of documents. Once generated, a user may search the plurality of documents while occurrences of the ignore string in the plurality of documents are ignored in text-based searches.

21 Claims, 12 Drawing Sheets

FIG. 3F

SEARCHING DOCUMENTS USING A DYNAMICALLY DEFINED IGNORE STRING

BACKGROUND OF THE INVENTION

1. Field of the Invention

The field of the invention relates to search engines. More specifically, the field of the invention relates to searching documents using a dynamically defined ignore string.

2. Description of the Related Art

A search engine typically runs over a predefined collection of documents, returning all documents that match a string of search terms. In some cases, the search engine may return many documents that merely include standard text which includes the search terms. Examples of standard text in an email search domain include confidentiality notices, email signatures, etc. In such cases, the standard text is likely of little interest (if at all) to a user. As a result, the search terms may be ineffective because the search engine returns a large number of documents, many (or even most) of which merely contain the standard piece of text that is not of interest to the user.

SUMMARY OF THE INVENTION

One embodiment of the invention includes a method for searching a plurality of documents. The method may generally include configuring one or more processors to perform an operation. The operation itself may generally include receiving user input specifying one or more search terms and receiving user input specifying an ignore string. The ignore string specifies a string of text to ignore when searching for occurrences of the search terms in the plurality of documents. The operation may also include evaluating each of the plurality of documents to identify documents which include an occurrence of at least one of the search terms not occurring within an instance of the ignore string and returning an indication of the identified documents as responsive results for display on a graphical display device.

In a particular embodiment, evaluating the plurality of documents itself may include accessing an index that maps a given term to each document, and position within that document, in which the given term occurs and generating an overlay index from the ignore string and the index. The overlay index may provide a mapping for each term in the ignore string to each document, and position within that document, in which a respective term in the ignore string occurs outside of an instance of the ignore string in that document. Evaluating the plurality of documents may further include processing each search term in the one or more search terms. Upon determining that the ignore string includes the search term, documents including the respective search term are identified using the overlay index. Otherwise, upon determining that the ignore string does not include the search term, documents which include that search term are identified using the accessed index.

Another embodiment includes a computer program product, the computer program product comprising a computer usable medium having computer usable program code for searching a plurality of documents. The code may be configured for receiving user input specifying one or more search terms and receiving user input specifying an ignore string. The ignore string specifies a string of text to ignore when searching for occurrences of the search terms in the plurality of documents. The code may be further configured for evaluating each of the plurality of documents to identify documents which include an occurrence of at least one of the search terms not occurring within an instance of the ignore string and returning an indication of the identified documents as responsive results for display on a graphical display device.

Still another embodiment of the invention includes a system having a processor and a memory containing a program, which when executed by the processor is configured to perform an operation for searching a plurality of documents. The operation may generally include receiving user input specifying one or more search terms and receiving user input specifying an ignore string. The ignore string specifies a string of text to ignore when searching for occurrences of the search terms in the plurality of documents. The operation may also include evaluating each of the plurality of documents to identify documents which include an occurrence of at least one of the search terms not occurring within an instance of the ignore string and returning an indication of the identified documents as responsive results for display on a graphical display device.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 3A-3G illustrate exemplary graphical user interface (GUI) screens of a search tool, according to one embodiment of the invention.

DETAILED DESCRIPTION OF THE PREFERRED EMBODIMENTS

Figure 1:
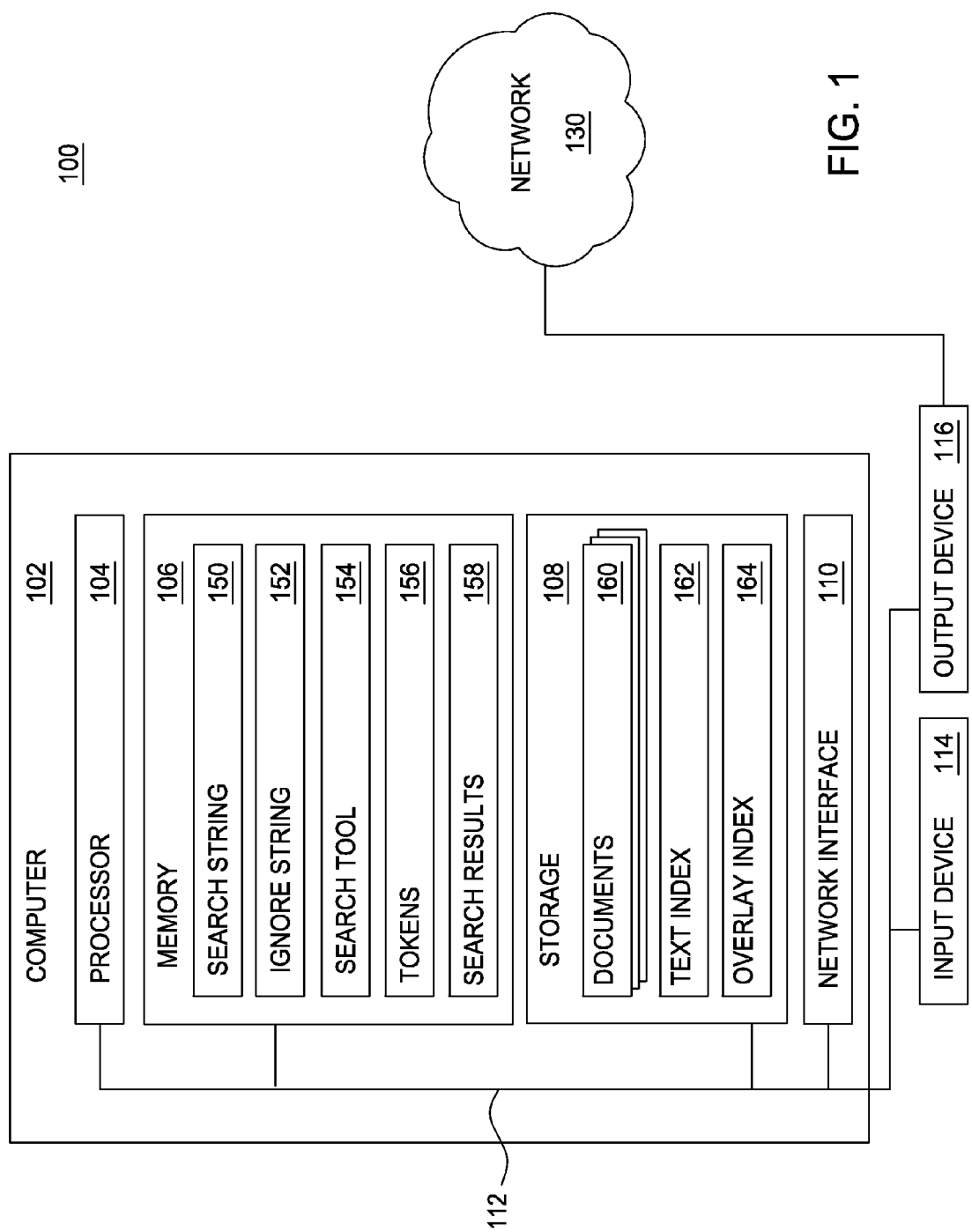
FIG. 1 is a block diagram illustrating a system for searching documents using an ignore string, according to one embodiment of the invention.

Embodiments of the present invention generally search documents using a dynamically defined ignore string. One embodiment of the invention provides a search tool. The search tool may generate an overlay index over the plurality of documents. The overlay index may include a posting list for each term in the ignore string. In turn, each posting list may specify a set of documents in which one of the respective terms occurs outside of the ignore string. The overlay index may also include a posting list that specifies all occurrences of the ignore string in the plurality of documents. Once the search tool generates the overlay index, a user may search the plurality of documents and occurrences of the search terms in the ignore string do not result in a document being added to search results. Further, the search tool may efficiently generate an overlay index using a term-at-a-time approach. As a result, the search tool may dynamically regenerate the overlay index to accommodate new ignore strings. That is, ignore strings may be dynamically defined and applied to searches over a plurality of documents. Further, the ignore string may be specified by a user.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for searching documents using an ignore string. The ignore string may also be referred to herein as "ignore text." The system 100 includes a computer 102 that may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used.

The memory 106 may be a random access memory. While the memory 106 is shown as a single entity, it should be understood that the memory 106 may in fact comprise a plurality of modules, and that the memory 106 may exist at multiple levels, from high speed registers and caches to lower speed but larger DRAM chips.

The network interface device 110 may be any entry/exit device configured to allow network communications between the computer 102 and the server 132 via the network 130. For example, the network interface device 110 may be a network adapter or other network interface card (NIC).

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used.

The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes a search string 150, an ignore string 152, a search tool 154, tokens 156, a temp index 166, and search results 158. Further, the storage 108 of the computer 102 includes documents 160, a text index 162, and an overlay index 164. FIGS. 2 through 5 and associated descriptions detail the structure and operation of the search tool 154 running on the computer 102.

Although embodiments are described herein with reference to a client-server network model, network models other than client-server, such as peer-to-peer, are broadly contemplated.

Figure 2:
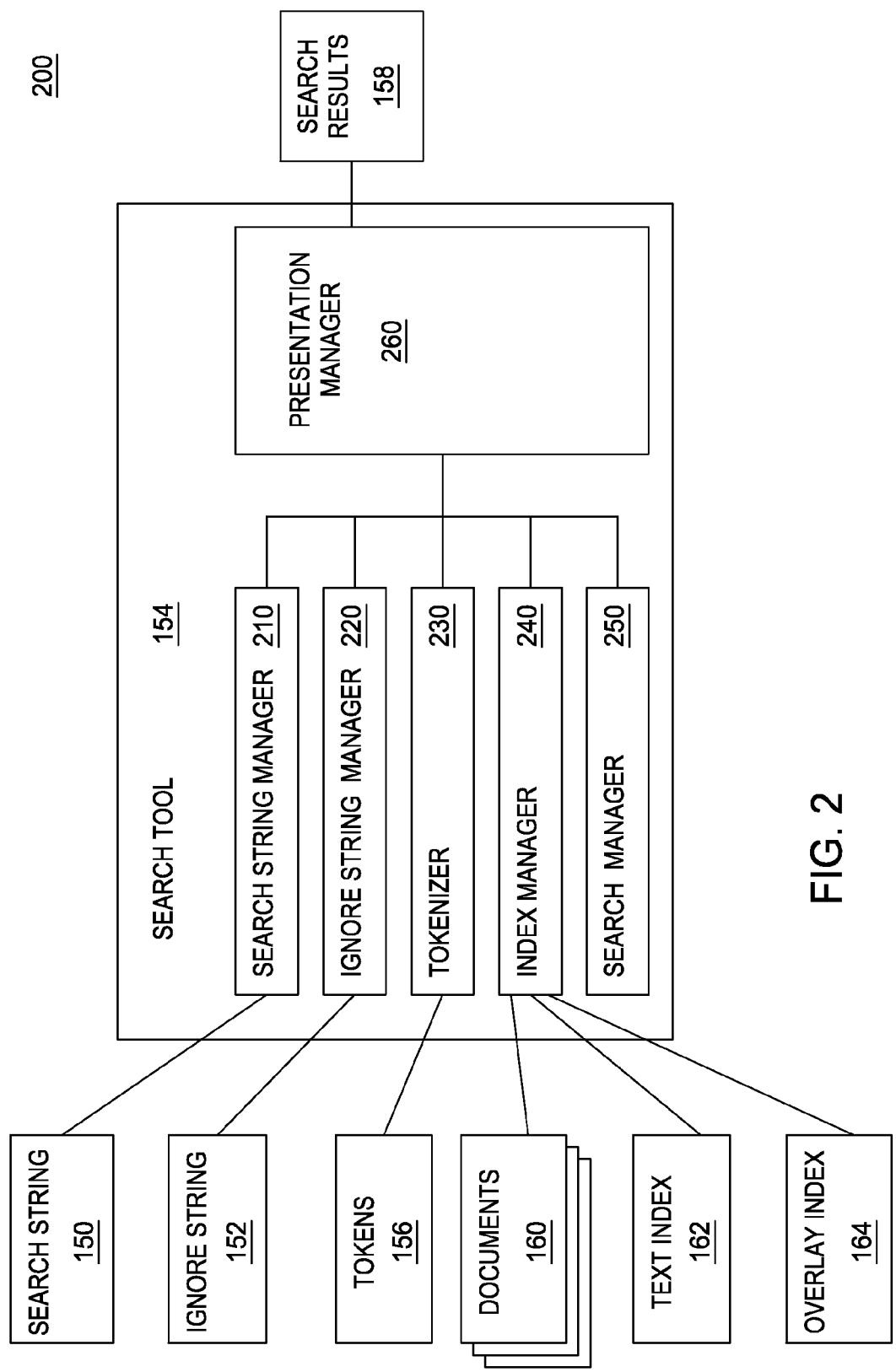
FIG. 2 is a block diagram illustrating a functional view of a search tool, according to one embodiment of the invention.

FIG. 2 is a block diagram 200 further illustrating components of the search tool 154 first shown in FIG. 1, according to one embodiment of the invention. As shown, the search tool 154 includes a search string manager 210, an ignore string manager 220, a tokenizer 230, an index manager 240, a search manager 250, and a presentation manager 260.

In one embodiment, the search string manager 210 receives a search string 150 from a user. A search string 150 may include one or more search terms (or search keywords). Table I shows an illustrative search string 150:

TABLE I

Search string example

| Search string: | test |
|---|---|

In this specific example, the search string manager 210 receives a search string 150, "test", from a user. For example, a user may input "test" as a search string 150 using an input device 114 such as a keyboard. That is, the user desires to search a plurality of documents 160 to find documents that include the search string 150 "test". The search string 150 may also include one or more search terms, such as "field test" (in which case the search string 150 includes two search terms: "field" and "test"). Table II shows an illustrative plurality of documents 160 in an email search domain. Other search domains (i.e., searches over documents other than email) are broadly contemplated.

TABLE II

Plurality of documents example

| Document | Contents | Remarks |
|---|---|---|
| Email A | . . . order new equipment for the test . . . | Occurrence of "test" |
| | . . . this is a test email from my mobile phone | Email signature |
| Emails B-O | . . . this is a test email from my mobile phone | Email signature |
| Emails P-Z | . . . | No occurrence of "test" |

In this specific example, the plurality of documents 160 includes twenty-six emails, labeled A through Z. Email A includes an occurrence of the search string 150 "test". Further, email A includes an email signature "this is a test email from my mobile phone" that also includes the search string 150 "test". Emails B through O do not include any occurrence of "test" other than in the email signature "this is a test email from my mobile phone." Emails P through Z do not include any occurrence of "test" at all. That is, emails P through Z do not include either "test" or "this is a test email from my mobile phone."

Suppose a user desires to search for emails that contain occurrences of the word "test". The user may input a search string 150 of Table I to search the plurality of documents 160 of Table II. In response to the search string 150, the search tool 154 may generate search results 158. Table III shows illustrative search results 158 for the search string 150 "test":

TABLE III

Search results example for search string "test"
Search string: test
Search results:

| Email A | Email B | Email C | Email D | Email E |
|---|---|---|---|---|
| Email F | Email G | Email H | Email I | Email J |
| Email K | Email L | Email M | Email N | Email O |

That is, the search tool 154 may generate a result list of fifteen emails (namely, emails A through O of Table II). However, the user may not be interested in any standard text that includes search string 150. Examples of standard text include confidentiality notices, email signatures, etc.

For instance, emails A through O of Table II include an email signature "this is a test email from my mobile phone" that in turn includes the search string 150 "test". However, the user is probably not interested in occurrences of the search string 150 in standard text such as the email signature "this is a test email from my mobile phone." In other words, a user may wish to exclude (from search results 158) documents that include the search string 150 only in standard text (or in any user-defined text).

In one embodiment, the ignore string manager 220 receives an ignore string 152 from the user. The "ignore string" is used herein to refer to any user-defined (or user-specified) string that may be ignored when searching a plurality of documents 160 for a search string 150. Table IV shows an illustrative ignore string 152:

TABLE IV

Ignore string example

| Ignore string: | a test email |
|---|---|

That is, a user may specify an ignore string 152 "a test email." In generating search results for a user, the search tool 154 may ignore occurrences of a search string 150 inside of the ignore string. Put another way, the search tool 154 may generate, as a search result, a list of only those documents that include occurrences of the search string 150 (e.g., "test") other than within occurrences of the ignore string 152 (e.g., "a test email").

TABLE V

Filtered search results example

| Search string: | test |
|---|---|
| Ignore string: | a test email |
| Search results: | Email A |

In this specific example, a search using a search string 150 "test" and an ignore string "a test email" yields email A as the only search result from the plurality of documents 160 (of Table II). Search results 158 generated from a search string 150 and an ignore string 152 may also be referred to as filtered search results. In effect, the search tool 154 filters out documents for which the search string 150 occurs only within the ignore string 152. That is, the user need no longer see emails B through O (for which "test" occurs only within "a test email") in the search results 158.

In one embodiment, the tokenizer 230 generates tokens 156 from the plurality of documents 160. Further, the tokenizer 230 may also generate tokens 156 from the search string 150 and the ignore string 152. Each token 156 may be a string of consecutive non-whitespace characters. Table VI shows illustrative tokens 156 for the ignore string 152:

TABLE VI

Tokens example

| Ignore string: | a test email |
|---|---|
| Token T0: | a |
| Token T1: | test |
| Token T2: | email |

In this specific example, the tokenizer 230 generates tokens 156 from the ignore string 152 "a test email." In this example, tokens 156 includes three tokens, one for each distinct word (or other character sequence) in the ignore string "a", "test", and "email.".

In one embodiment, the index manager 240 may generate a text index 162, a temp index 164, and an overlay index 164 over the plurality of documents 160. In another embodiment, the text index 162 may be provided to the index manager 240 (i.e., the text index 162 already exists). The text index 162 describes all occurrences of every token 156 found in the plurality of documents 160. That is, the text index may include a mapping for each token (i.e., each word or other character sequence) to a list of documents which contain that token. Each document may be referenced by an identifier (referred to herein as a "document ID"). Specifically, for a given token 156, the text index 162 describes documents (and offsets therein) in which the given token 156 occurs. To illustrate, suppose the plurality of documents 160 include the following documents (as shown in Table VII):

TABLE VII

Plurality of documents example

| Document | Contents |
|---|---|
| D0 | a test email from my |
| D1 | a test a test my test |
| D2 | a test a test email a test my |

In this specific example, the plurality of documents 160 includes three documents: D0, D1, and D2. Each document contains one or more words (or terms). In one embodiment, the index manager 240 may provide a text index 162 over the plurality of documents 160. Table VIII shows an illustrative text index 162 for the plurality of documents 160 D0, D1, and D2:

TABLE VIII

Text index example token → first document<token indexes>, second document<token indexes>, . . .
a → D0<0>, D1<0,2>, D2<0,2,5>
email → D0<2>, D2<4>
from → D0<3>
my → D0<4>, D1<4>, D2<7>
test → D0<1>, D1<1,3,5>, D2<1,3,6>

In this specific example, the text index 162 includes an entry (e.g., a row) for each term or word in the corpus of documents (i.e., the plurality of documents 160; in this example: D0, D1, and D2). Each entry may also be referred to as a "posting list." Collectively, the entries may also be referred to as a "term dictionary." For example, the plurality of documents 160 example of Table V includes only the five words "a", "test", "email", "from", and "my". The text index 162 may include an entry for each of the five words (or tokens), for a total of five entries. The entries may also be sorted alphabetically by token, according to one embodiment.

As shown, each entry follows a syntax token→first document<token indexes>, second document<token indexes>, . . . . In other words, a token may be found in a first document at token indexes, in a second document at token indexes, and so forth. For example, the text index 162 of Table VIII includes an entry for the token "a". The entry reads a→D0<0>, D1<0, 2>, D2<0, 2, 5>. Accordingly, the token "a" occurs at offset 0 of the document D0. Further, the token "a" occurs at offsets 0 and 2 of the document D1. Further still, the token "a" occurs at offsets 0, 2, and 5 of the document D2. In other words, token "a" occurs as the first, third, and sixth tokens in document D2. The text index 162 may be implemented by any data structures (or combinations thereof), including abstract data types (ADTs), sufficient to represent tokens 156, documents 160, and token offsets. For example, a three-dimensional linked list, a three-dimensional array, or a vector-based data structure may be used to represent the text index 162.

The text index 162 of Table VIII also includes an entry for the token "email". The entry reads email→D0<2>, D2<4>. Thus, the token "email" occurs at offset 2 of document D0 and at offset 4 of document D2. Similarly, the text index 162 of Table VIII includes an entry for the token "from". The entry reads from→D0<3>. Thus, the token "from" occurs at offset 3 of document D0. The text index 162 of Table VIII also includes an entry for the token "my". The entry reads my→D0<4>, D1<4>, D2<7>. Thus, the token "my" occurs at offset 4 of document D0, at offset 4 of document D1, and at offset 7 of document D2. Furthermore, the text index 162 also includes an entry for the token "test". The entry reads test→D0<1>, D1<1, 3, 5>, D2<1, 3, 6>. Thus, the token "test" occurs at offset 1 of document D0, at offsets 1, 3, and 5 of document D1, and at offsets 1, 3, and 6 of document D2.

In one embodiment, the index manager 240 may also generate an overlay index 164 over the plurality of documents 160. The overlay index 164 specifies the documents (and offsets therein) in which the ignore string 152 occurs in the plurality of documents 160. Further, the overlay index 164 specifies the documents (and offsets therein) in which each token in the ignore string 152 occurs outside of the ignore string 152 in the plurality of documents 160. Table IX shows an illustrative overlay index 164 for an ignore string 152 "a test email":

TABLE IX

Overlay index example token → first document<token indexes>, second document<token indexes>, . . .
_exclude:term → D0<0P3>, D2<2P3>
a → D1<0,2>, D2<0,5>
test → D1<1,3,5>, D2<1,6>

In this specific example, the overlay index 164 includes a special posting list for a reserved token_exclude. The special posting list specifies each occurrence of the ignore string 152 in the plurality of documents 160. Specifically, the special posting list describes documents (and offsets therein) in which the ignore string 152 occurs. The presentation manager 250 may use the special posting list to format occurrences of the ignore string 152 in the plurality of documents 160 to distinguish the text in the ignore string 152 from other text in the plurality of documents 160 (e.g., graying out occurrences of the ignore string 152). In one embodiment, the overlay index 164 may also include posting lists for a plurality of ignore strings 152.

As shown, the special posting list corresponds to the ignore string example of Table IV (namely, "a test email") and reads_exclude:term→D0<0P3>, D2<2P3>. The letter P stands for payload, which is used herein to refer to the number of tokens of the ignore string 152. That is, the ignore string 152 "a test email" occurs at offset 0 of the document D0 (for a payload, or length, of 3 tokens). Further, the ignore string 152 "a test email" occurs at offset 2 of the document D2 (for a payload of 3 tokens). These instances of an ignore string 152 may also be referred to herein as "exclude spans." Further, the payload may be stored elsewhere than in the special posting list, according to one embodiment. For example, because a payload of an ignore string "a test email" is 3, the payload may be omitted in the special posting list:_exclude:term→D0<0>, D2<2>. That is, the payload may be stored elsewhere in the overlay index, or outside of the overlay index altogether.

As shown, the overlay index 164 includes entries for tokens in documents D0, D1, and D2 (for example, "a", "test", and "email"). However, unlike text index 162, above, the overlay index 164 includes entries for tokens (in the ignore string) which occur outside of the ignore string 152 in the plurality of documents 160. Further still, unlike the text index 162, if a token 156 only appears in an ignore string 152, the overlay index 164 may exclude an entry for the token 156. Moreover, for a given token 156, the overlay index 164 includes documents (and offsets therein) in which the given token 156 occurs outside of the ignore string 152.

The overlay index 164 of Table IX includes an entry for the token "a". The entry reads a→D1<0, 2>, D2<0, 5>. Thus, the token "a" occurs, outside of the ignore string "a test email," at offsets 0 and 2 of document D1. Further, the token "a" occurs, outside of the ignore string "a test email," at offsets 0 and 5 of document D2. Taken together, the index manager 240 may exclude part of the posting list (namely, D0<0>, D2<2>) for the token "a" from the overlay index 164.

Unlike the text index 162 of Table VIII, the overlay index 164 of Table IX omits an entry for the token "email". This is because each occurrence of the token "email" was within the ignore string "a test email". That is, the index manager 240 may exclude the entire posting list (namely, D0<2>, D2<4>) for the token "email" from the overlay index 164.

Unlike the text index 162 of Table VIII, the overlay index 164 of Table IX omits entries for the tokens "from" and "my." This is because the posting list for the token "from" is unaffected by an ignore string of "a test email". Any such posting list may merely be identical to the corresponding posting list in the text index 162 (i.e., from→D0<3> and my→D0<4>, D1<4>, D2<7>). In other words, the index manager 240 may exclude postings list from the overlay index 164 for being redundant.

The overlay index 164 of Table IX also includes an entry for the token "test". The entry reads test→D1<1, 3, 5>, D2<1, 6>. Thus, the token "test" occurs, outside of the ignore string "a test email," at offsets 1, 3, and 5 of the document D1. Further, the token "my" occurs, outside of the ignore string "a test email," at offsets 1 and 6 of document D2. Taken together, the index manager 240 excludes part of the posting list (namely, D0<1>, D2<3>) for the token "test" from the overlay index 164.

Further, the search tool 154 may also support facet-based navigation following a search. A user may use facet-based navigation following a search over a plurality of documents 160 to apply one or more additional filters to the search results 158. The additional filters categorize and summarize the search results according to a plurality of independent attributes, or "facets" of the plurality of documents. The facets may be specific to the type of the plurality of documents. For example, if the plurality of documents is emails, facets may include "sender", "recipient", and "date." Table X shows an illustrative facet-based navigation without an ignore string 152 (based on the search results of Table III):

TABLE X

Facet-based navigation example (without ignore string)
Emails:

| By year | By sender | By email attachment |
|---|---|---|
| 2008 (15) | Tom (11) | No attachments (18) |
| 2007 (5) | Bob (9) | Attachments (2) |

In this specific example, the search results from Table III (namely, twenty emails, A through O) are categorized and summarized by the facets of year, sender, and email attachment. As shown, under the "year" facet, of the twenty emails of Table III, fifteen are dated from the year 2008, while five are dated from the year 2007. Further, under the "sender" facet, eleven are from Tom, while nine are from Bob. Further still, under the "email attachment" facet, eighteen include no attachments, while two include attachments. In one embodiment, the user may apply one or more of these "facet-based" filters. For example, the user may click on "Tom (11)" using a pointing device to see only the eleven emails from Tom and to update the other facets (namely, "year" and "email attachment") based on the newly selected eleven emails from Tom.

In one embodiment, the search tool 154 may update facet counts to exclude tokens occurring within an ignore string 152. Table XI shows an illustrative facet-based navigation with an ignore string 152 (based on the filtered search results of Table V):

TABLE XI

Facet-based navigation example (with ignore string)
Emails:

| By year | By sender | By email attachment |
|---|---|---|
| 2008 (1) | Tom (1) | No attachments (1) |

In this specific example, the search results of Table V (namely, email A from Table II, above) are categorized and summarized by the facets of year, sender, and email attachment. As shown, under the "year" facet, the single email of Table V is from 2008. Further, under the "sender" facet, the single email of Table V is from Tom. As shown, the search tool 154 updates both the facet counts and the facet values to exclude tokens occurring within an ignore string 152 in the plurality of documents 160. For example, the number of emails from the year 2008 is shown as one (as opposed to fifteen in Table X). Further, the facet total for the year 2007 is no longer shown (as opposed to the facet total of five emails for the year 2007 shown in Table X). Thus, if results are filtered out due to the ignore text, and the hit list becomes smaller, corresponding facet counts also get smaller.

Further, in one embodiment, facet counts may also be defined based on document content. For example, for a facet "companies," the occurrence of company names (e.g., "IBM") in non-structured email text (or other document content) may be used to provide a facet count. In such a case, if each email contained a footer of "Copyright IBM Corporation," the facet count for the "companies" facet becomes misleading. However, if a user defines the string "Copyright IBM Corporation" as the exclude text, then the overall count for the "companies" facet excludes documents which only include a company name as a result of the common footer language. In other words, if a document contains the string "Copyright IBM Corporation," but no other occurrence of "IBM," then the count for the would not be incremented based on that document.

In one embodiment, the search manager 250 generates search results 158 using the search string 150, text index 162, and the overlay index 164. For example, the search manager 250 may generate the search results of Table III or the filtered search results of Table V.

In one embodiment, the presentation manager 260 outputs search results 158 to a user via the output device 116. For example, the presentation manager 260 may output the search results of Table III or the filtered search results of Table V to a graphical display device.

Figure 3A:
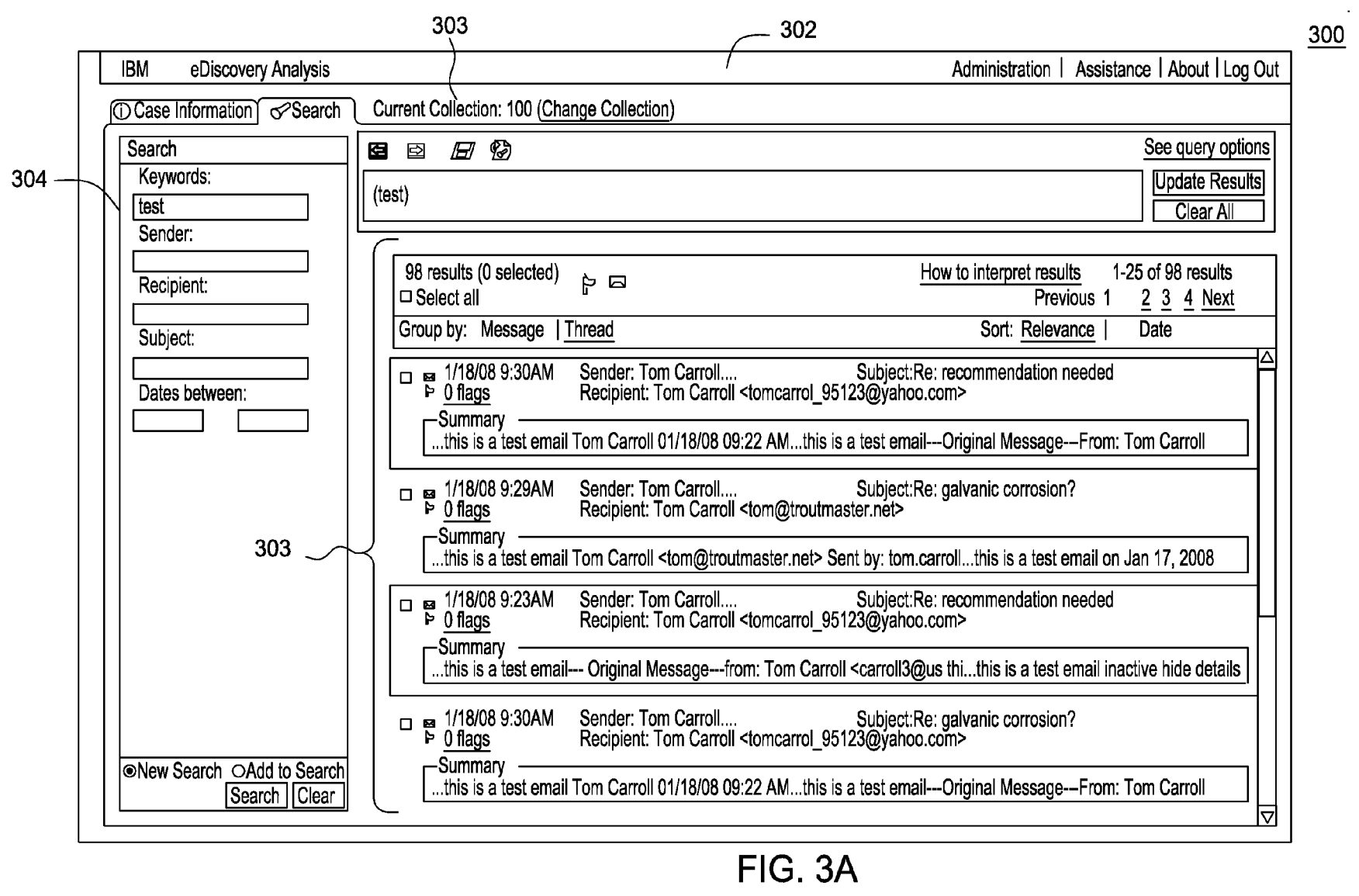
Figure 3B:
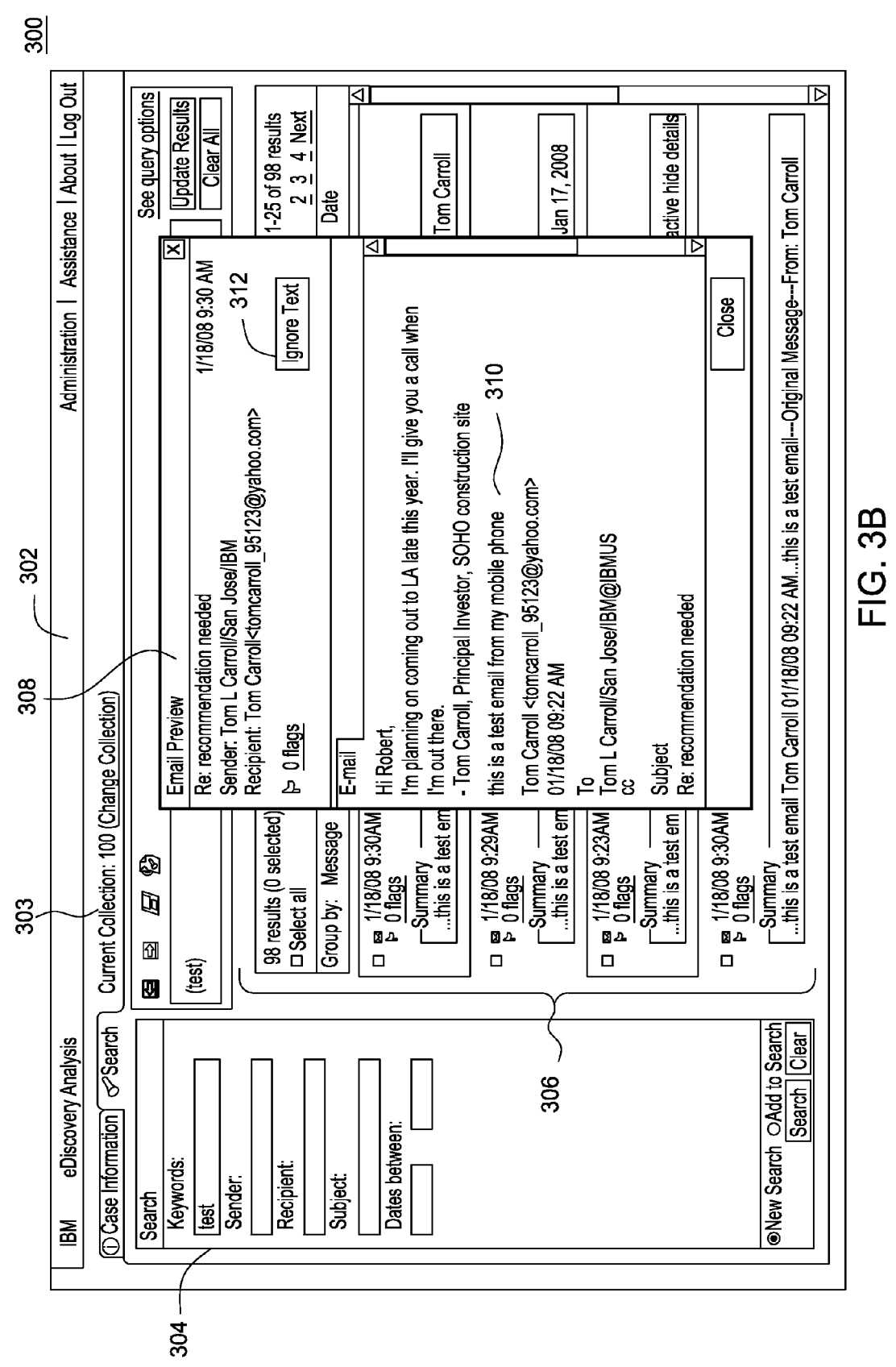
Figure 3C:
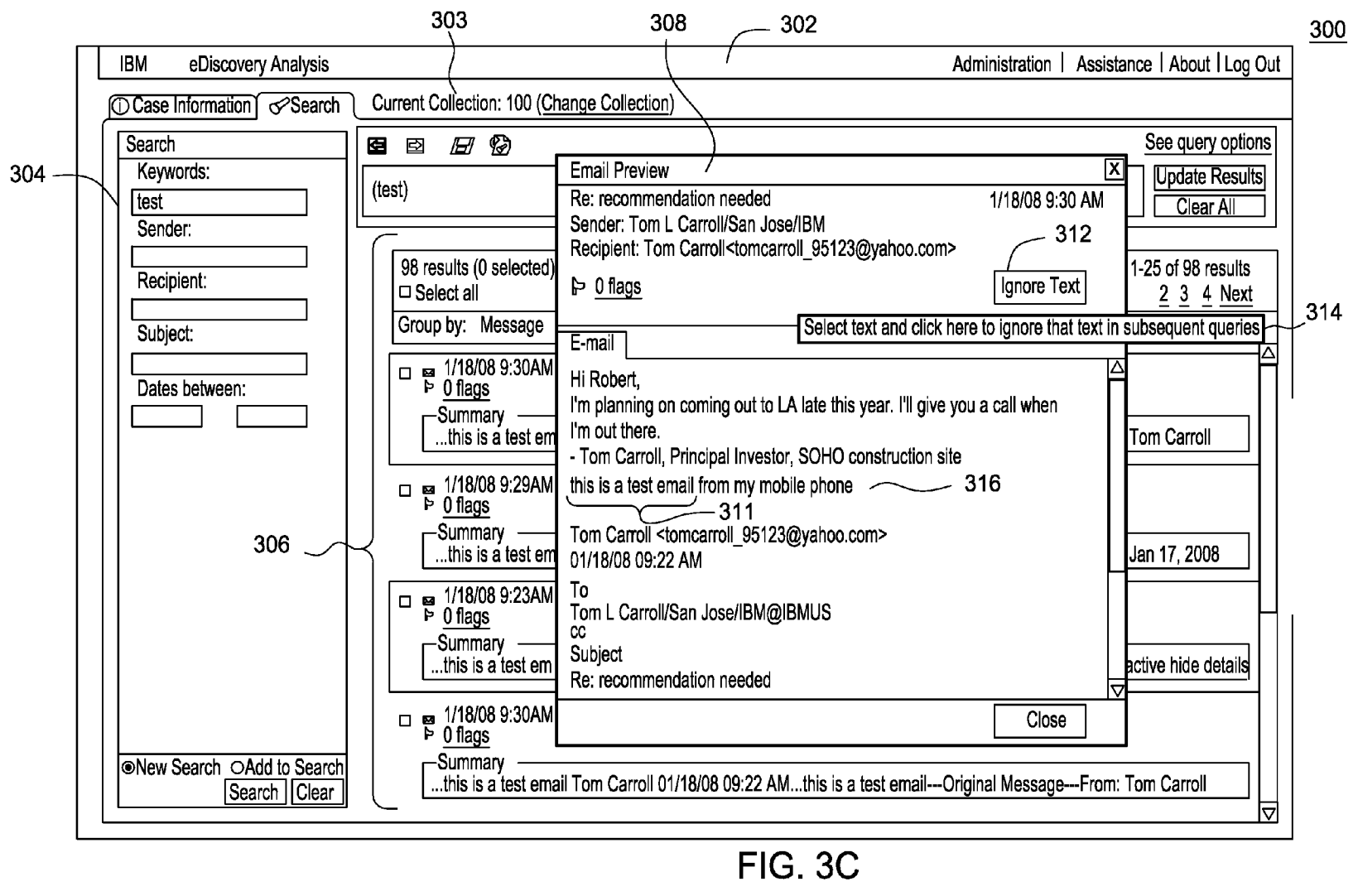
Figure 3D:
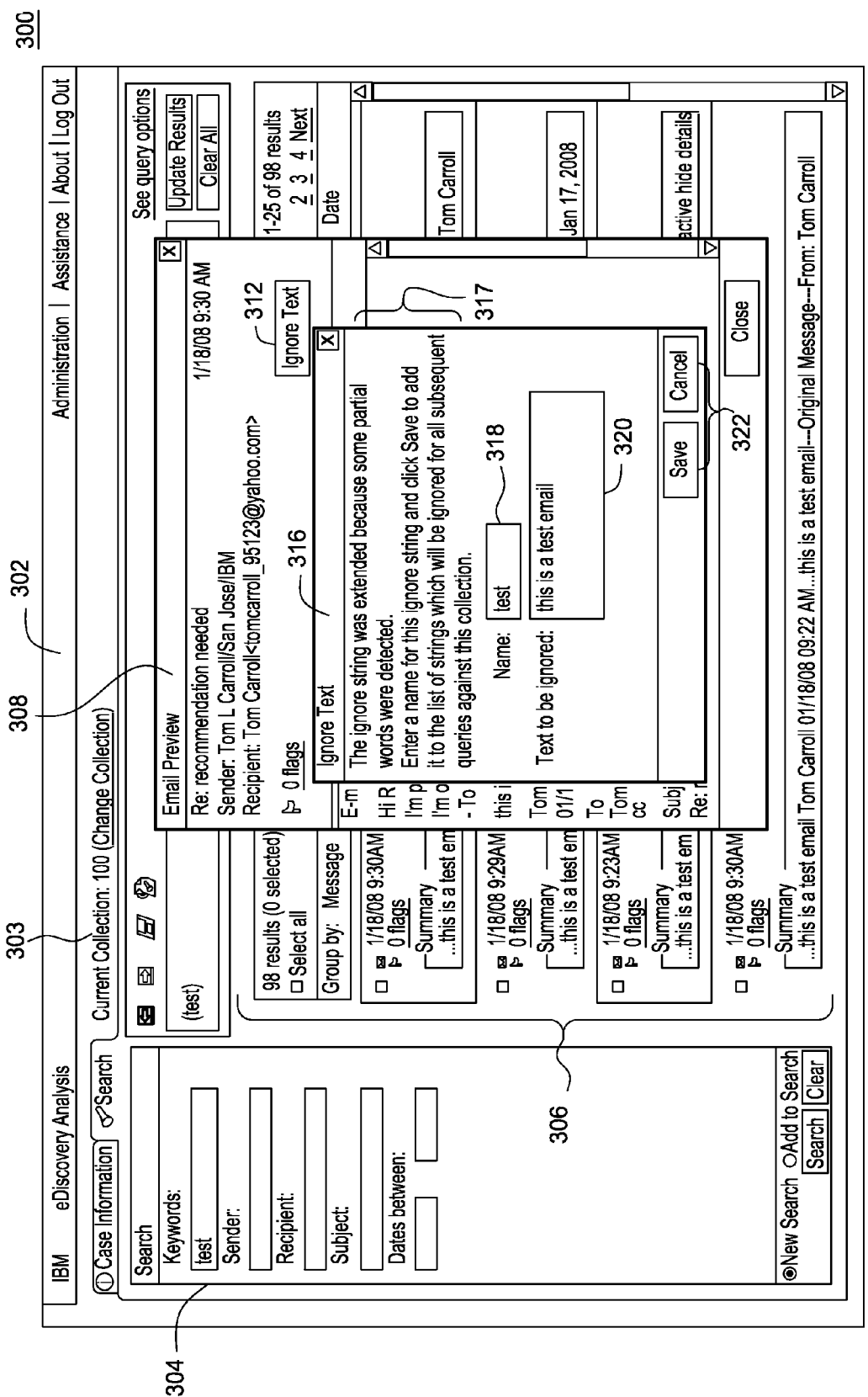

FIGS. 3A-3G illustrate exemplary graphical user interface (GUI) screens of a search tool 154, according to one embodiment of the invention. FIG. 3A illustrates a GUI 300 that includes an application window 302, a document collection reference 303, a search string 304, and search results 306, according to one embodiment. The document collection reference 303 may be any plurality of documents 160. For example, the document collection reference 303 may be a plurality of documents associated with a legal case, a business project, an investigation, a research project, etc. As shown, the document collection reference 303 states that the current collection (i.e., the plurality of documents against which to search) is "collection 100."

Search string 304 corresponds to the search string 150 of FIG. 1. As shown, the search string 304 includes a single word (token) "test". Search results 306 correspond to the search results 158 of FIG. 1. As shown, the search results 306 include a total of 98 results. That is, the search tool 154 finds ninety-eight documents matching the search string 304 "test". As shown, for many of the ninety-eight results, the search string 304 "test" occurs in a context of a phrase in the email reading "this is a test email."

FIG. 3B illustrates a GUI 300 that includes a document window 308 displaying a document from the search results 306, according to one embodiment. As shown, the document window 308 displays the first document from the search results 306 of FIG. 3A. Further, contents of the first document include a sentence 310 in which the search string 304 "test" occurs. As shown, the sentence 310 reads, "this is a test email from my mobile phone." Further still, the document window includes a button 312 labeled "Ignore Text."

FIG. 3C illustrates a GUI 300 that includes a tooltip 314 displaying supplemental information about the button 312, according to one embodiment. As shown, the supplemental information includes "Select text and click here to ignore that text in subsequent queries." That is, a user may select an ignore string in the document (such as highlighted text 311 of FIG. 3C) and click the button 312. For example, the user may use a mouse to highlight text 311 that is part of the sentence 310. As shown in FIG. 3C, a user highlights a portion of the sentence 310: "this is a test email from my mobile phone." After selecting text, the user may click on the button 312.

FIG. 3D illustrates a GUI 300 that includes an input window 316 for defining an ignore string 152, according to one embodiment. As shown, the input window 316 includes instructions 317, a text field 318 for a naming an ignore string 152, a text field 320 for defining the ignore string, and buttons 322. Buttons 322 include a "Save" button and a "Cancel" button. Illustratively, the instructions 317 state: "The ignore string was extended because some partial words were detected." That is, the user of FIG. 3C merely selected "this is a test em." However, the search tool 154 may expand selected text to include complete tokens, thereby expanding the selection to "this is a test email" In this case. In another embodiment, the search tool 154 may truncate text to exclude partial tokens (e.g., contracting the selection to "this is a test"). Alternatively still, the search tool 154 allow substrings to be selected as ignore text. That is, "em" may be accepted as a token 156 of the ignore string 152.

Further, the instructions 317 state, "Enter a name for this ignore string and click Save to add it to the list of strings which will be ignored for all subsequent queries." The user may specify a name for the ignore string 152 via the text field 318. Further, the user may define the ignore string 152 (i.e., define a string to be ignored) via the text field 320. As shown, the search tool 154 has pre-populated text fields 318, 320 with default values of "test" and "this is a test email," respectively. The default values correspond to the search string 150 and the selected text of FIG. 3C. The user may click on the "Save" button to save the ignore string 152. Alternatively, the user may click on the "Cancel" button return to the document window 308 and/or the application window 302.

Figure 3E:
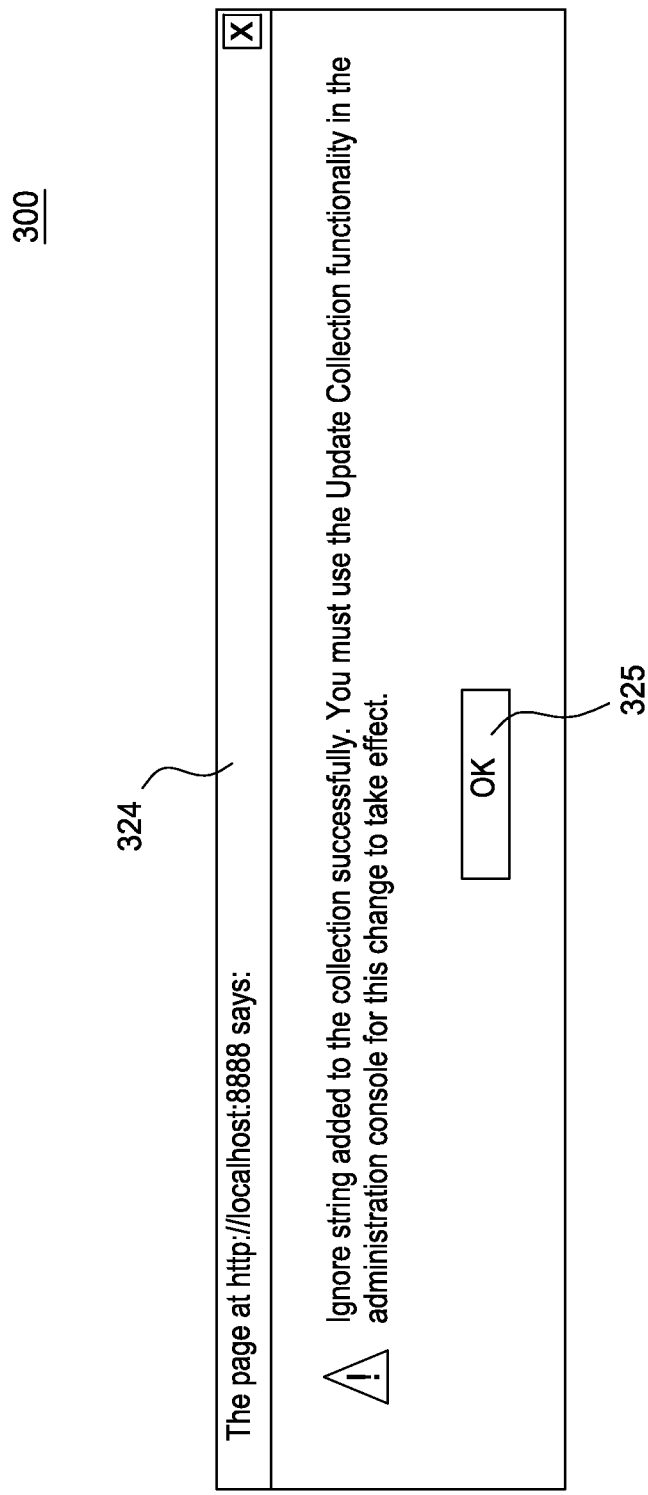

FIG. 3E illustrates a GUI 300 that includes a dialogue box 324, according to one embodiment. The dialogue box 324 states, "Ignore string added successfully." In one embodiment, after the ignore string 152 is specified, the search tool 154 rebuilds the overlay index 164. In another embodiment, the search tool 154 may delay rebuilding the overlay index 164 until the user separately invokes an update command on the document collection reference 303 (i.e., the plurality of documents 160). For example, the dialogue 324 box further states, "You must use the Update Collection functionality in the administration console for this change to take effect." For instance, a user may delay rebuilding the overlay index until the user specifies five ignore strings. In this instance, the search tool 154 may build the overlay index once (instead of five times). Further, the user may acknowledge a message on the dialogue box 324 by clicking on a button 325 labeled "OK".

Figure 3F:
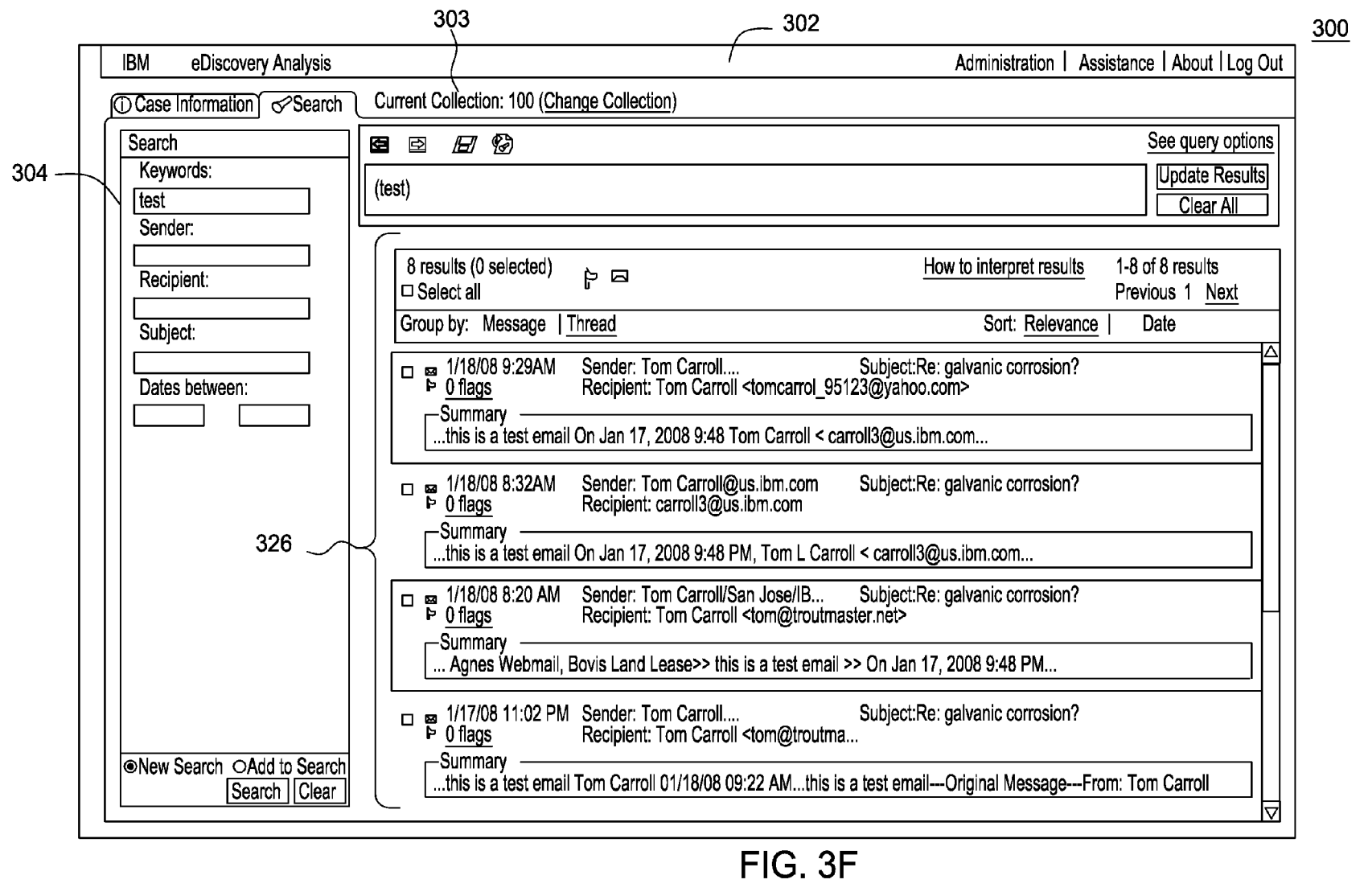

FIG. 3F illustrates a GUI 300 that includes search results 326, according to one embodiment. As shown, the search results 326 include a total of eight results (in contrast to the ninety-eight results of FIG. 3A). Further, the search results 326 no longer include documents in which the search string 304 "test" occurs only within the ignore string 152 "a test email." As shown, for at least several of the eight results, the search string 304 "test" occurs in a context of "this is a test emaiml." That is, the search includes the string "this is a test emaiml" because the string does not match the ignore string (i.e., because there is an extra letter "m" in "emaiml").

Figure 3G:
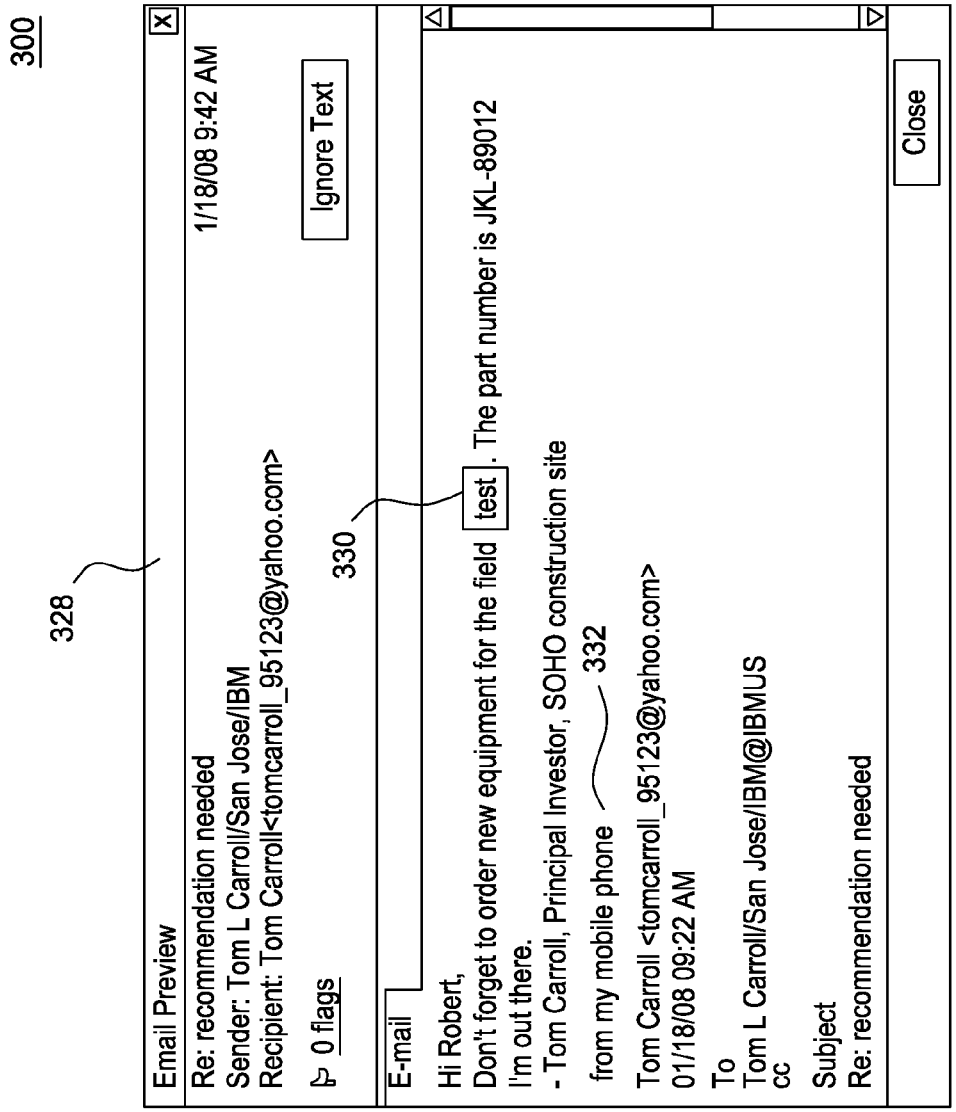

FIG. 3G illustrates a GUI 300 that includes a document window 328 displaying a document from the search results 326 of FIG. 3F, according to one embodiment. As shown, the search string 330 "test" occurs in a context "Don't forget to order new equipment for the test. The part number is JKL-89012." In one embodiment, occurrences of the search string 150 in a document may be formatted to distinguish the search string 150 from other text in the document. For example, the occurrence of the search string 150 is highlighted in FIG. 3G (to indicate a match with the search string 150).

Further, the document also includes an occurrence 332 of the ignore string "this is a test email." In one embodiment, occurrences of the ignore string 152 in a document may be formatted to distinguish the ignore string 152 from other text in the document (including the search string 150). For example, the occurrence of the ignore string "this is a test email" is grayed out in FIG. 3G (to indicate that the occurrence was ignored in the search).

Figure 4A:
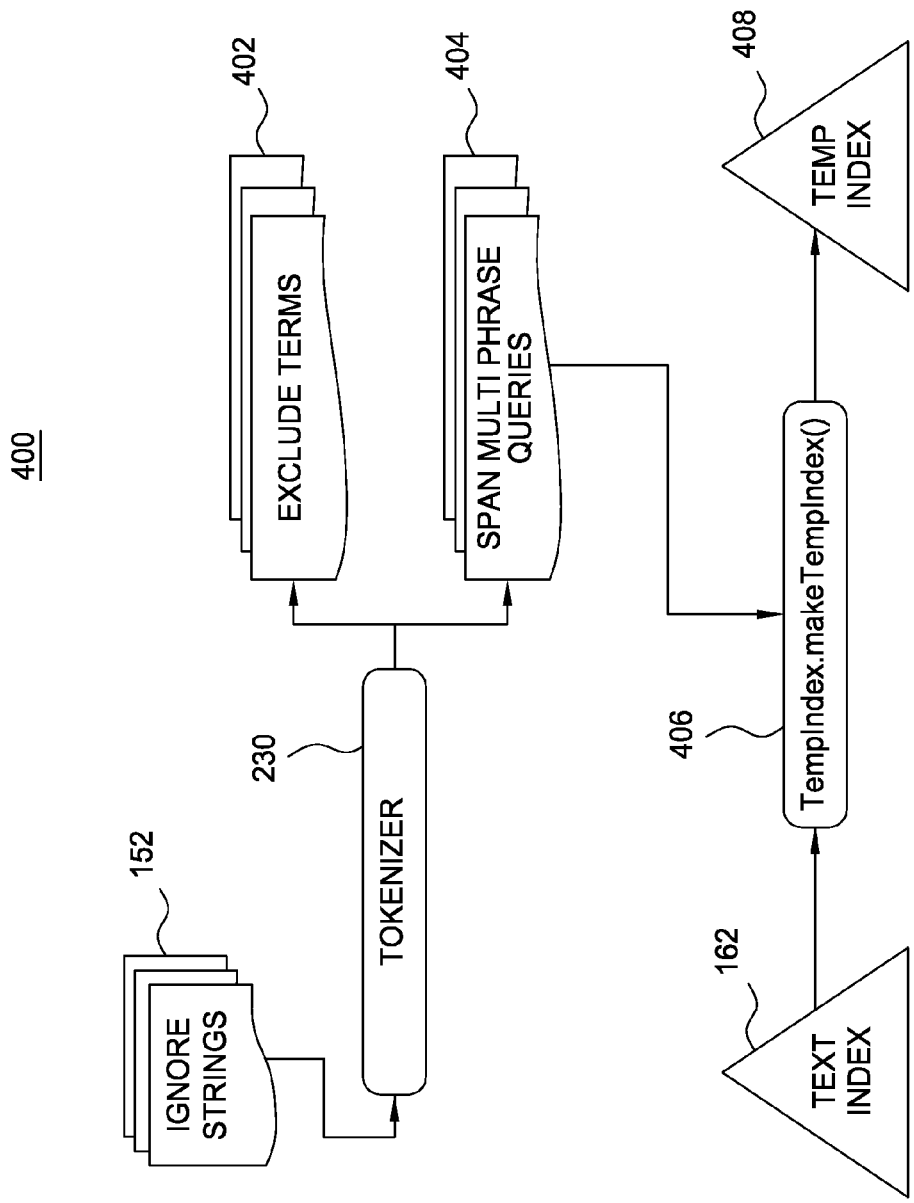
FIGS. 4A-4B illustrate data flows for generating an overlay index, according to one embodiment of the invention.
Figure 4B:
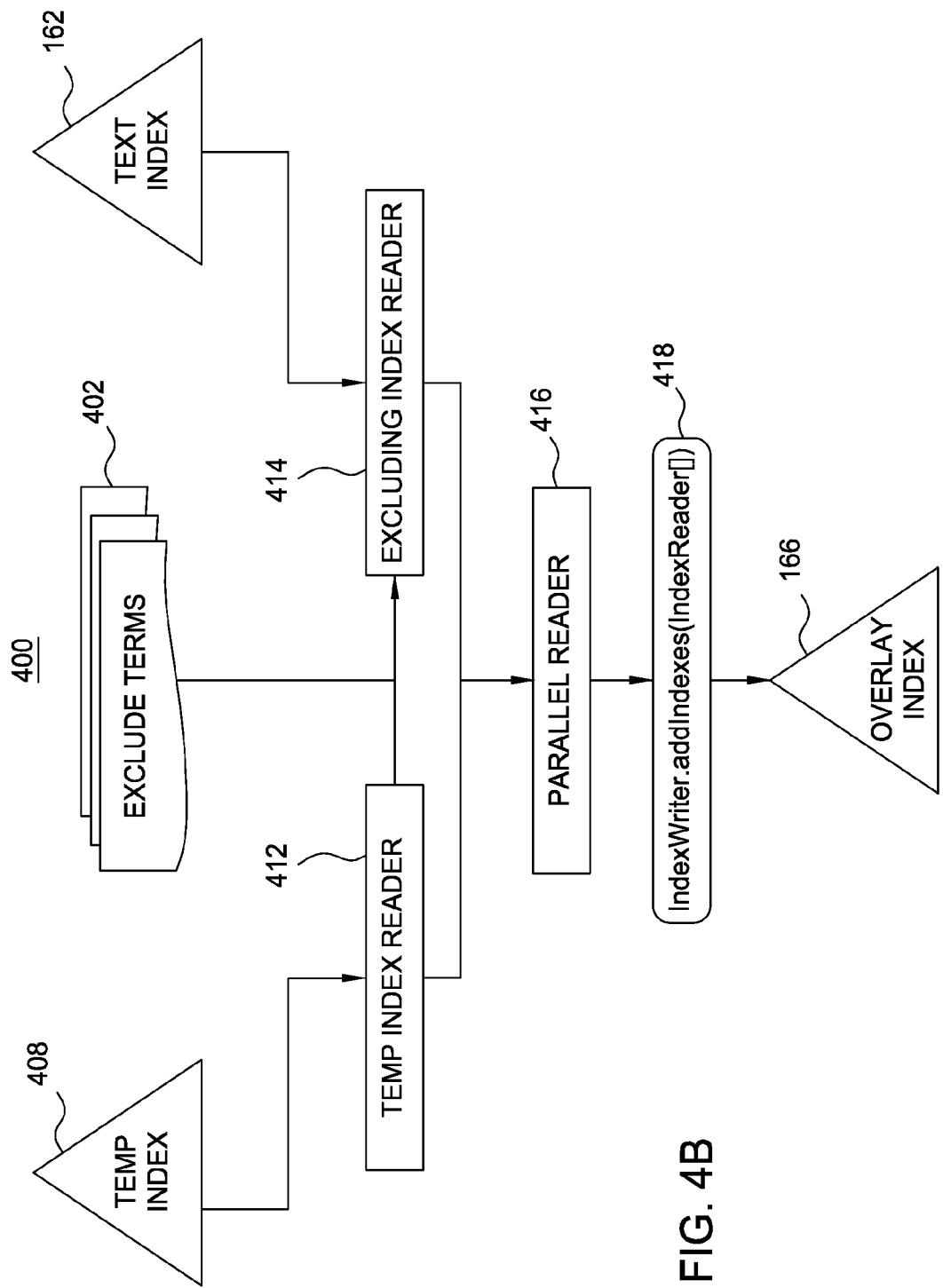

FIGS. 4A-4B illustrate data flows for generating an overlay index 164 using a term-at-a-time approach, according to one embodiment of the invention. That is, the search tool 154 may generate the overlay index 164 term by term, resulting in sequential I/O (input/output) reads with good performance. Such good performance allows the overlay index 164 to be generated (and/or rebuilt) dynamically to include new ignore strings 152. In contrast, generating an overlay index 164 document by document (i.e., document-at-a-time) may result in parallel I/O reads with poor performance. Such poor performance may not allow the overlay index 164 to be generated (and/or rebuilt) dynamically (i.e., at will to include new ignore strings 152). That is, because of poor performance, the overlay index 164 may only seldom be generated and/or rebuilt FIGS. 4A-4B illustrate data flow diagrams for generating an overlay index, according to one embodiment of the invention. Note, however, one of skill in the art will readily recognize that the data flow diagrams illustrated in FIGS. 4A-4B provide an example a class structure used to implement one possible embodiment of the invention and that a variety of other approaches and implementations may be used.

FIG. 4A illustrates a data flow 400 for generating a temporary index. As described below, the temporary index may be used to generate the overlay index 164. In one embodiment, building the overlay index includes two steps. Firstly, a temp index is created that contains a single posting list with the spans of all ignore text occurrences in all documents. Secondly, the final overlay index is built, using the information stored in the temp index to filter the posting lists of the ignore text terms.

Referring to FIG. 4A, the tokenizer 230 receives ignore strings 152 and generates ExcludeTerms 402 and SpanMultiPhraseQueries 404. To do so, the tokenizer 230 may parse the ignore strings 152 into tokens 156. Each of SpanMultiPhraseQueries 404 corresponds to an ignore string 152 parsed into tokens and stored as a vector. In one embodiment, an ignore string 152 may include special search keywords, e.g., logical operators using the search terms as operands. For example, special search keywords may include "or" (e.g., as in "test or email", etc.). SpanMultiPhraseQueries may exclude such special search keywords.

Further, the tokenizer 230 may create an in-memory copy of a text index 162. For example, the search tool 154 may return an object that reads the in-memory index and that belongs to a class IndexReader. For example, the search tool 154 may return TempIndex.TempIndexReader (i.e., TempIndex is a class representing a temp index; TempIndexReader is a class representing a reader for a temp index). TempIndexReader may be a subclass of IndexReader.

The tokenizer 230 may invoke a function to create a temp index 408. For example, the tokenizer 230 may invoke a function TempIndex.makeTempIndex ( ), which creates a temp index 408 based on the text index 162 and the SpanMultiPhraseQueries 404. The tokenizer 230 may also add ExcludeTerms 402 to the temp index 408. ExcludeTerms 402 may include a posting list for each term of the ignore string 152. Further, TempIndexReader may override certain methods of IndexReader (such as numDocs ( ), isDeleted ( ), and hasDeletions ( )) to return values from the text index 162. Doing so keeps document IDs of the text index 162 and of the temp index 408 in sync.

FIG. 4B illustrates a data flow 410 for generating an overlay index 164 from a temp index 408, according to one embodiment. As shown, the TempIndexReader 412 reads from the temp index 408. Further, the ExcludingIndexReader 414 reads the text index 162. The ExcludingIndexReader 414 may return only terms from the underlying text index that are included in the ExcludeTerms 402. This is because the overlay index 164 includes only such terms. The ExcludingIndexReader 414 may filter out occurrences of terms within an exclude span according to the exclude spans returned from the TempIndexReader 412.

The search tool 154 may also add both TempIndexReader 412 and ExcludingIndexReader 414 to a ParallelReader 416. Further, the search tool 154 may pass the ParallelReader 416 to a method that writes the overlay index 164. For example, the search tool 154 may pass the ParallelReader 416 to a method IndexWriter.addindexes (IndexReader[ ]) 418.

This method IndexWriter.addindexes (IndexReader[ ]) 418 processes input from the ParallelReader 416 term by term (i.e., term at-a-time), resulting in sequential I/O (input/output) reads with good performance. As a result, the method may write an overlay index 164 that includes filtered (i.e., according to the exclude spans), non-empty posting lists of all ignore strings 152. Further, the overlay index 164 may also include the posting list with exclude spans from the temp index 164.

Further, the search tool 154 closes the IndexWriter object 418 and opens the overlay index 164 using an IndexReader object. The search tool 154 uses the IndexReader object to delete document IDs in the overlay index 164 marked as deleted in the text index 162. The search tool 154 then closes the IndexReader object and commits all changes. As a result, the generated overlay index 164 and the text index 164 contain matching document IDs.

Once the overlay index 164 is generated, the search tool 154 may process a query. In one embodiment, the search tool 154 may process the query using an OverlayIndexReader. For example, as the search tool 154 processes each search term of a search string 150, the search tool 154 may request an associated posting list and positions of the respective search term. The search tool 154 may request an associated posting list via a method OverlayIndexReader.termDocs ( ). Further, the search tool 154 may request associated positions via a method OverlayIndexReader.termPositions ( ). Both of these methods are further discussed below.

Note, the query itself need not be "ignore-string aware." That is, queries are not composed any differently to be aware of the ignore text. Instead, the OverlayIndexReader hides the fact that there is an overlay index. Thus, the search tool 154 does not need to know whether it is executing a query against a "normal" IndexReader or an OverlayIndexReader, as both may have the same interface. Thus, no coding changes are required to extend an existing query runtime engine and query evaluation performance is identical, whether or not an overlay index is used or only a text index.

In one embodiment, the OverlayIndexReader may open the text index 162 and the overlay index 164. Further, the OverlayIndexReader may check if methods numDocs ( ) and maxDoc ( ) of both indexes 162, 166 return the same values. If the returned values differ, the indexes 162, 166 may be out of sync. That is, the overlay index 164 may not be used until the overlay index 164 is regenerated.

The OverlayIndexReader may retrieve a list of ignore strings and iterate over the terms (i.e., the term dictionary) of the overlay index 164. Two sets of terms may result. The two sets of terms may include termsInOverlayIndex and termsInExcludedTexts. termsInOverlayIndex may include terms in the overlay index 164. termsInExcludedTexts may include terms in the ignore strings 152.

Further, the method OverlayIndexReader. termDocs ( ) may check if a search term occurs in termsInExcludedTexts. If not, the method may open a TermPositions object from the underlying textIndexReader. However, if the search term occurs in termsInExcludedTexts, then the method checks if the search term also occurs in the overlay index 164 (i.e., in termsInOverlayIndex). If so, the method opens the posting list in the overlay index 164 corresponding to the search term and returns an OverlayTermDocs object. Otherwise, the method invokes ReturnNoMatchTermPositions ( ), because the search term does not occur outside of ignore strings 152 (i.e., exclude spans). In other words, the posting list corresponding to the search term is empty. The method may return an OverlayTermDocs object.

Further still, the method OverlayIndexReader.termPositions ( ) may operate in a similar manner as the method OverlayIndexReader.termDocs ( ), but return an OverlayTermPositions object instead of an OverlayTermDocs object.

Figure 5:
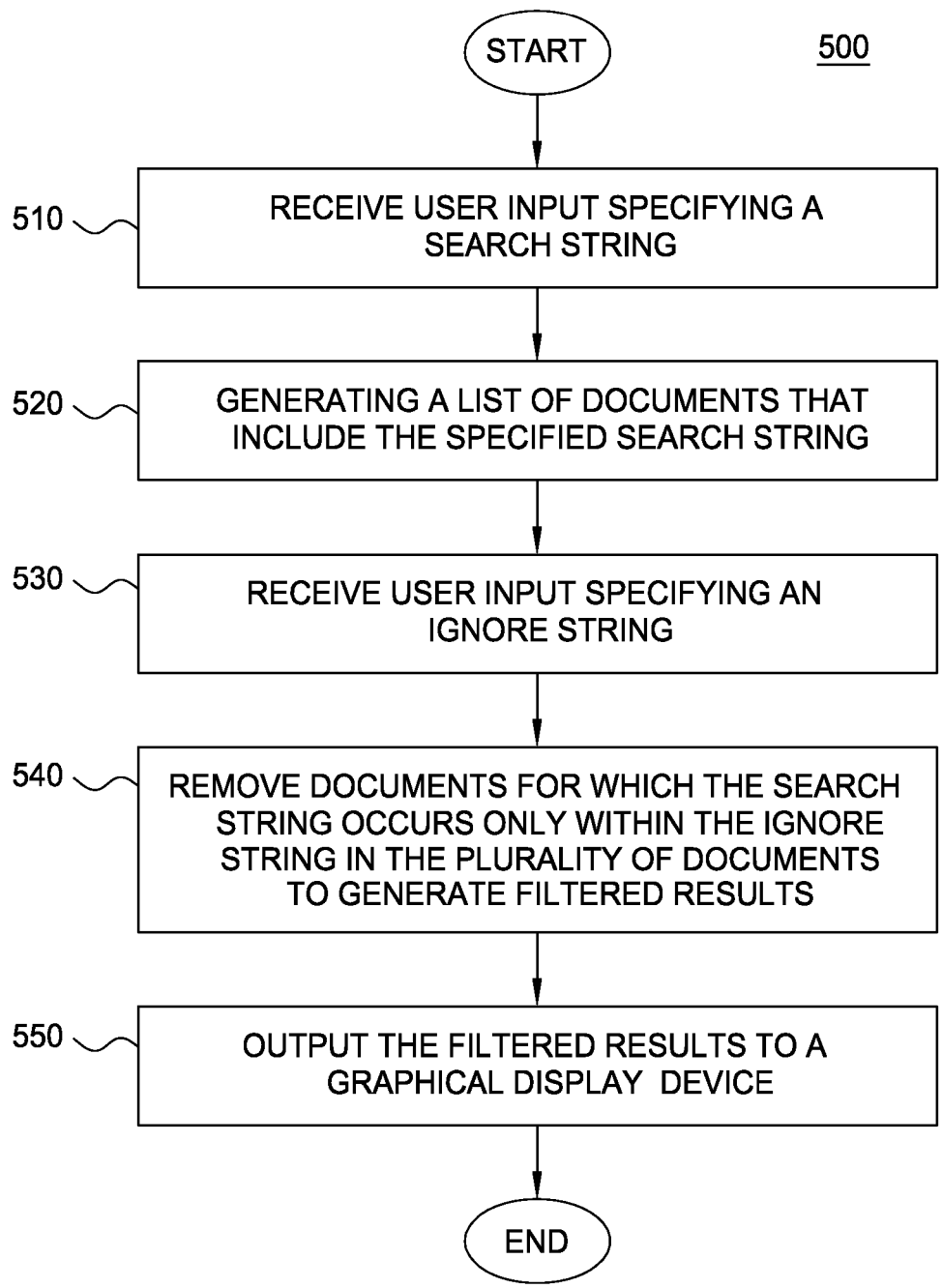
FIG. 5 is a flowchart illustrating a method for searching documents, according to one embodiment of the invention.

FIG. 5 is a flowchart illustrating a method 500 for searching documents 160, according to one embodiment of the invention. The method 500 may be performed by the search tool 154 of FIG. 1. The steps of the method 500 are described in conjunction with the search string example of Table II, the ignore string example of Table IV, the filtered search results example of Table V, the text index example of Table VIII, and the overlay index example of Table IX.

As shown, the method 500 begins at step 510, where the search string manager 210 receives user input specifying a search string 150. For example, the search string manager 210 may receive the search string of Table II or of element 304 of FIG. 3A. At step 520, the search manager 250 may generate a first search result 158, which may include a list of documents that contain the specified search string 150. For example, the search manager 250 may generate the search results of Table III or of element 306 of FIG. 3A.

At step 530, the ignore string manager 220 may receive user input specifying an ignore string 152. For example, the ignore string manager 220 may receive the ignore string of Table IV or of element 320 of FIG. 3D. At step 540, the search manager 250 may remove documents for which the search string 150 occurs only within the ignore string 152 in the plurality of documents, thereby generating a second search result (or filtered search results 158). For example, the search manager 250 may generate the filtered search results of Table V or of element 326 of FIG. 3F. For example, in one embodiment, in order for the search manager 250 to remove documents at step 540, the index manager 240 may provide a text index 162 and generate an overlay index 164. The overlay index 164 may include a posting list for each term of the ignore string 152. Further, for each term of the ignore string 152, the overlay index 164 may specify documents in which the respective term occurs outside of the ignore string 1512. For example, the index manager 240 may provide the text index of Table VIII, and generate the overlay index of Table IX. Then to identify whether a document includes a given search term (or terms), the search manager 250 first determines whether the token 156 corresponding to the given term is present in the ignore string. If so the overlay index 164 is used to identify documents including the given token 156. That is, the search manager 250 identifies documents which may be responsive to the search, as the search string 150 is present, but not as part of an instance of the ignore string 152. Otherwise, if the token is not part of the ignore string 152, the search manager 250 may determine which documents include the token 156 using the regular index. If the search string 150 includes multiple terms, then each token may be processed in a similar manner and the results intersected (in the case of an "AND"ing search) or unioned (in the case of an "OR"ing search).

At step 550, the presentation manager 260 may output the filtered search result 158 to the user via the output device 116. For example, the presentation manager 260 may output the filtered search results of Table V or of element 326 of FIG. 3F. After step 550, the method 500 terminates.

Of course, the embodiments described herein are intended to be illustrative and not limiting of the invention, and other embodiments are broadly contemplated. Those skilled in the art will recognize, for example, that embodiments of the invention may be adapted to documents other than emails. Further, the search tool may generate an overlay index even if a user does not provide a search string. For example, a user may merely specify an ignore string. The search tool may generate an overlay index for all future searches over a plurality of documents to ignore the specified ignore string. For example, an admin of a plurality of documents may specify ignore strings for a plurality of users that search the plurality of documents. Further still, multiple ignore strings may be supported by a single overlay index or by a plurality of overlay indexes (e.g., that are specific to an ignore string). Still further, multiple pluralities of documents may be supported by a single overlay index or by a plurality of overlay indexes (e.g., that are specific to a plurality of documents).

Advantageously, embodiments of the invention search a plurality of documents using a dynamically defined ignore string. The ignore string may be specified by a user. In one embodiment, a search tool may generate an overlay index over the plurality of documents. The overlay index may include a posting list for each term in the ignore string. Each posting list may specify the documents of the plurality of documents in which the respective term occurs outside of the ignore string. The overlay index may also include a posting list that specifies all occurrences of the ignore string in the plurality of documents. Once the search tool generates the overlay index, a user may search the plurality of documents while ignoring occurrences of the ignore string in the plurality of documents. Further, the search tool may efficiently generate an overlay index using a term-at-a-time approach. As a result, the search tool may dynamically regenerate the overlay index to accommodate new ignore strings and/or new pluralities of documents.

While the foregoing is directed to embodiments of the present invention, other and further embodiments of the invention may be devised without departing from the basic scope thereof, and the scope thereof is determined by the claims that follow.

What is claimed is:

1. A computer implemented method to search a plurality of documents based on a specified context pertaining to a first search term and not pertaining to a second search term, the computer implemented method comprising:

receiving a search request for documents containing the first search term and the second search term, wherein the search request specifies the first search term, the second search term, and a context in which to ignore occurrences of specifically the first search term, wherein the specified context comprises a string containing a plurality of terms including the first search term and the second search term, wherein within the specified context, occurrences of the second search term register as hits whereas occurrences of the first search term do not register as hits, wherein outside of the specified context, occurrences of the first search term and of the second search term, respectively, register as hits;

accessing a term index and an overlay index, wherein the term index maps a given term to each document, and position within that document, in which the given term occurs, wherein the overlay index comprises a mapping for each term in the specified context to each document, and position within that document, in which a respective term in the specified context occurs outside of an instance of the specified context in that document;

evaluating each of the plurality of documents based on the term index and the overlay index and by operation of one or more computer processors, in order to identify a set of documents that each includes: (i) an occurrence of the first search term outside any occurrence of the specified context and (ii) an occurrence of the second search term regardless of whether the occurrence of the second search term is within an occurrence of the specified context; and responsive to the search request, returning a set of search results based on the identified set of documents, wherein occurrences of at least one of the first search term and the specified context are formatted in the search results in order to distinguish the formatted occurrences from other text from the identified set of documents.

2. The computer implemented method of claim 1, wherein the overlay index includes a posting list for each term in the specified context, wherein the posting list specifies: (i) each occurrence of the specified context and (ii) the position of the respective occurrence of the specified context, in the plurality of documents.

3. The computer implemented method of claim 2, wherein the term index includes a posting list for each term used in the plurality of documents, wherein the plurality of documents further includes:
   (i) a first document having, inside the specified context, an occurrence of the first search term and no occurrences of the second search term and, outside the specified context, an occurrence of the second search term and no occurrences of the first search term
   (ii) a second document having, inside the specified context, respective occurrences of the first and second search terms and, outside the specified context, no occurrences of any of the first and second search terms.

4. The computer implemented method of claim 3, wherein the plurality of documents further includes:
   (iii) a third document having, inside the specified context, respective occurrences of the first and second search terms and, outside the specified context, an occurrence of the first search term and no occurrences of the second search term;
   (iv) a fourth document having, inside the specified context, an occurrence of the first search term and no occurrences of the second search term and, outside the specified context, respective occurrences of the first and second search terms.

5. The computer implemented method of claim 4, wherein the plurality of documents further includes:
   (v) a fifth document having, inside the specified context, no occurrences of any of the first and second search terms and, outside the specified context, respective occurrences of the first and second search terms; and
   (vi) a sixth document having, inside the specified context, an occurrence of the second search term and no occurrences of the first search term and, outside the specified context, an occurrence of the first search term and no occurrences of the second search term.

6. The computer implemented method of claim 5, wherein the identified set of documents does not include the first document, does not include the second document, and does include the third, fourth, fifth, and sixth documents.

7. The computer implemented method of claim 6, wherein the term index is generated based on the plurality of documents, wherein the overlay index is generated based on the specified context and the term index, wherein documents including the first search term are identified using the overlay index if the first search term is included in the specified context and using the term index if the first search term is not included in the specified context.

8. A computer program product for searching a plurality of documents based on a specified context pertaining to a first search term and not pertaining to a second search term, the computer program product comprising:
   a computer usable storage medium having computer usable program code configured for:
      receiving a search request for documents containing the first search term and the second search term, wherein the search request specifies the first search term, the second search term, and a context in which to ignore occurrences of the first search term, wherein the specified context comprises a string containing a plurality of terms including the first search term and the second search term, wherein within the specified context, occurrences of the second search term register as hits whereas occurrences of the first search term do not register as hits, wherein outside of the specified context, occurrences of the first search term and of the second search term, respectively, register as hits;
      accessing a term index and an overlay index, wherein the term index maps a given term to each document, and position within that document, in which the given term occurs, wherein the overlay index comprises a mapping for each term in the specified context to each document, and position within that document, in which a respective term in the specified context occurs outside of an instance of the specified context in that document;
      evaluating each of the plurality of documents based on the term index and the overlay index and by operation of one or more computer processors when executing the computer usable program code, in order to identify a set of documents that each includes: (i) an occurrence of the first search term outside any occurrence of the specified context and (ii) an occurrence of the second search term regardless of whether the occurrence of the second search term is within an occurrence of the specified context; and
      responsive to the search request, returning a set of search results based on the identified set of documents, wherein occurrences of at least one of the first search term and the specified context are formatted in the search results in order to distinguish the formatted occurrences from other text from the identified set of documents.

9. The computer program product of claim 8, wherein the overlay index includes a posting list for each term in the specified context, wherein the posting list specifies: (i) each occurrence of the specified context and (ii) the position of the respective occurrence of the specified context, in the plurality of documents.

10. The computer program product of claim 9, wherein the term index includes a posting list for each term used in the plurality of documents, wherein the plurality of documents further includes:
   (i) a first document having, inside the specified context, an occurrence of the first search term and no occurrences of the second search term and, outside the specified context, an occurrence of the second search term and no occurrences of the first search term
   (ii) a second document having, inside the specified context, respective occurrences of the first and second search terms and, outside the specified context, no occurrences of any of the first and second search terms.

11. The computer program product of claim 10, wherein the plurality of documents further includes:
   (iii) a third document having, inside the specified context, respective occurrences of the first and second search terms and, outside the specified context, an occurrence of the first search term and no occurrences of the second search term;
   (iv) a fourth document having, inside the specified context, an occurrence of the first search term and no occurrences of the second search term and, outside the specified context, respective occurrences of the first and second search terms.

12. The computer program product of claim 11, wherein the plurality of documents further includes:

(v) a fifth document having, inside the specified context, no occurrences of any of the first and second search terms and, outside the specified context, respective occurrences of the first and second search terms; and (vi) a sixth document having, inside the specified context, an occurrence of the second search term and no occurrences of the first search term and, outside the specified context, an occurrence of the first search term and no occurrences of the second search term.

13. The computer program product of claim 12, wherein the identified set of documents does not include the first document, does not include the second document, and does include the third, fourth, fifth, and sixth documents.

14. The computer program product of claim 13, wherein the term index is generated based on the plurality of documents, wherein the overlay index is generated based on the specified context and the term index, wherein documents including the first search term are identified using the overlay index if the first search term is included in the specified context and using the term index if the first search term is not included in the specified context.

15. A system to search a plurality of documents based on a specified context pertaining to a first search term and not pertaining to a second search term, the system comprising:

a processor; and a memory containing a program, which when executed by the processor is configured to perform an operation comprising:

receiving a search request for documents containing the first search term and the second search term, wherein the search request specifies the first search term, the second search term, and a context in which to ignore occurrences of the first search term, wherein the specified context comprises a string containing a plurality of terms including the first search term and the second search term, wherein within the specified context, occurrences of the second search term register as hits whereas occurrences of the first search term do not register as hits, wherein outside of the specified context, occurrences of the first search term and of the second search term, respectively, register as hits;

accessing a term index and an overlay index, wherein the term index maps a given term to each document, and position within that document, in which the given term occurs, wherein the overlay index comprises a mapping for each term in the specified context to each document, and position within that document, in which a respective term in the specified context occurs outside of an instance of the specified context in that document;

evaluating each of the plurality of documents based on the term index and the overlay index and in order to identify a set of documents that each includes: (i) an occurrence of the first search term outside any occurrence of the specified context and (ii) an occurrence of the second search term regardless of whether the occurrence of the second search term is within an occurrence of the specified context; and responsive to the search request, returning a set of search results based on the identified set of documents, wherein occurrences of at least one of the first search term and the specified context are formatted in the search results in order to distinguish the formatted occurrences from other text from the identified set of documents.

16. The system of claim 15, wherein the overlay index includes a posting list for each term in the specified context, wherein the posting list specifies: (i) each occurrence of the specified context and (ii) the position of the respective occurrence of the specified context, in the plurality of documents.

17. The system of claim 16, wherein the term index includes a posting list for each term used in the plurality of documents, wherein the plurality of documents further includes:

(i) a first document having, inside the specified context, an occurrence of the first search term and no occurrences of the second search term and, outside the specified context, an occurrence of the second search term and no occurrences of the first search term (ii) a second document having, inside the specified context, respective occurrences of the first and second search terms and, outside the specified context, no occurrences of any of the first and second search terms.

18. The system of claim 17, wherein the plurality of documents further includes:

(iii) a third document having, inside the specified context, respective occurrences of the first and second search terms and, outside the specified context, an occurrence of the first search term and no occurrences of the second search term;

(iv) a fourth document having, inside the specified context, an occurrence of the first search term and no occurrences of the second search term and, outside the specified context, respective occurrences of the first and second search terms.

19. The system of claim 18, wherein the plurality of documents further includes:

(v) a fifth document having, inside the specified context, no occurrences of any of the first and second search terms and, outside the specified context, respective occurrences of the first and second search terms; and (vi) a sixth document having, inside the specified context, an occurrence of the second search term and no occurrences of the first search term and, outside the specified context, an occurrence of the first search term and no occurrences of the second search term.

20. The system of claim 19, wherein the identified set of documents does not include the first document, does not include the second document, and does include the third, fourth, fifth, and sixth documents.

21. The system of claim 20, wherein the term index is generated based on the plurality of documents, wherein the overlay index is generated based on the specified context and the term index, wherein documents including the first search term are identified using the overlay index if the first search term is included in the specified context and using the term index if the first search term is not included in the specified context.

* * * * *